April 24, 1962     F. DOERR     3,030,996
LOCK NUT HAVING TENSION INDICATING SPRING MEANS
Filed Nov. 25, 1957     3 Sheets-Sheet 1

INVENTOR
Friedrich DOERR

By Bailey, Stephens & Huettig
ATTORNEYS

April 24, 1962 F. DOERR 3,030,996
LOCK NUT HAVING TENSION INDICATING SPRING MEANS
Filed Nov. 25, 1957 3 Sheets-Sheet 2
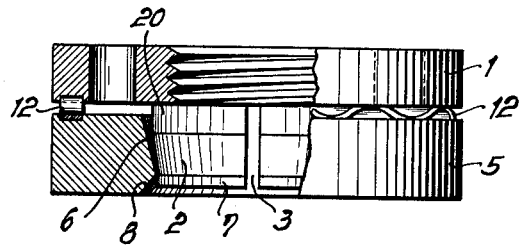
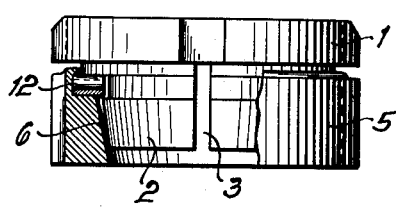
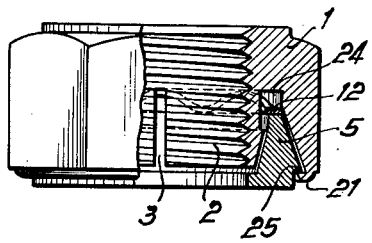
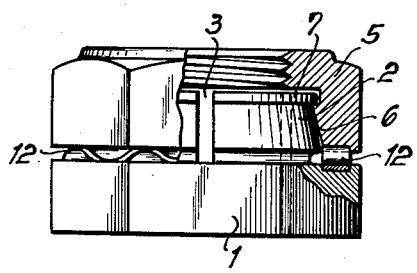
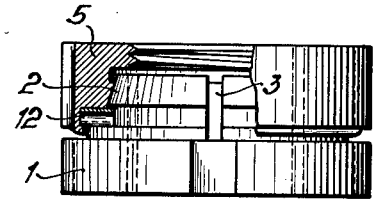
INVENTOR
Friedrich DOERR
By Bailey, Stephens & Huettig
ATTORNEYS April 24, 1962 F. DOERR 3,030,996
LOCK NUT HAVING TENSION INDICATING SPRING MEANS
Filed Oct. 25, 1957 3 Sheets-Sheet 3

INVENTOR
Friedrich DOERR
By Bailey, Stephens & Huettig
ATTORNEYS

United States Patent Office 3,030,996
Patented Apr. 24, 1962

3,030,996
LOCK NUT HAVING TENSION INDICATING
SPRING MEANS
Friedrich Doerr, Boblinger Strasse 49, Stuttgart, Germany
Filed Nov. 25, 1957, Ser. No. 698,856
Claims priority, application Germany Nov. 23, 1956
8 Claims. (Cl. 151—19)

The present invention relates to lock nuts and similar devices, and more particularly to a lock nut which consists of a plurality of parts.

Prior to this invention, multiple-part lock nuts or similar devices were made of an upper part with a slotted tapered cone thereon, a lower hollow-conical part surrounding the latter, and means for connecting the two parts, for example, by a bead or flanging.

It is an object of the present invention to provide a multiple-part lock nut or similar device of the above-mentioned type which, however, is distinguished therefrom by the provision of an exchangeable spring element which is interposed between the upper and lower parts and in which this resilient element is made of a suitable shape and suitable dimensions so that, when the lock nut is being tightened and a torque of a certain desired strength has been produced, the resilient element will normally prevent such torque from being exceeded.

The resilient element is therefore designed so as not only to press the workpieces which are to be connected against each other, but also subsequently thereto to produce the required tension in the bolt or the like upon which the nut is screwed. When the lock nut itself is tightened to a certain desired extent which corresponds to the strength of the spring, and an attempt is then made to tighten the nut still further, the lower part will be likewise turned which serves as a visual indication that the required tension is reached. By exchanging the interposed spring for one of a different strength, the lock nut may be designed for any desired torque. The spring is preferably made of a corrugated ring of flat material which is provided with a slot. However, it may also be made of round stock.

Further object, features, and advantages of the present invention will be apparent from the following detailed description thereof, particularly when read with reference to the accompanying drawings, all of which illustrate the invention partly in cross section and in which—

FIG. 6 shows another type of nut of a design similar to that illustrated in FIG. 4;

FIG. 7 shows a circular lock nut of a design similar to that illustrated in FIG. 2;

FIG. 8 shows another modification of the lock nut according to the invention;

FIG. 9 shows a lock nut of the type illustrated in FIG. 2 but with additional screw threads in the lower part;

FIG. 10 shows a setting ring of a design as illustrated in FIG. 4 but with additional screw threads in the lower part;

FIG. 13 shows a bolt or pipe connection; while

Figure 1:
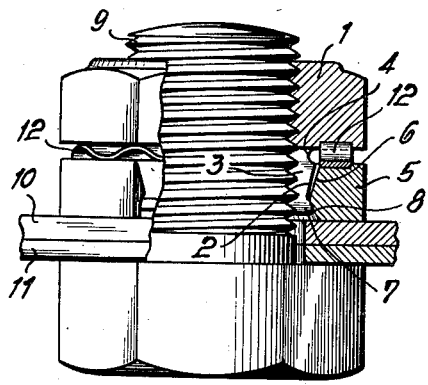
FIG. 1 shows a lock nut according to the invention mounted on a bolt.
Figure 2:
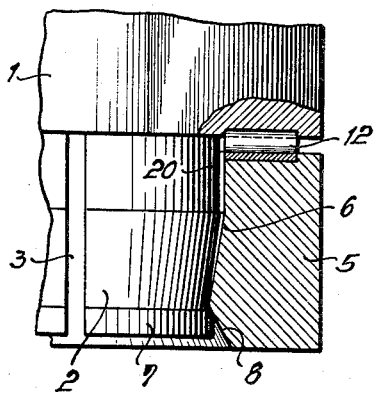
FIG. 2 shows a portion of FIG. 1 on an enlarged scale.

Referring to the drawings, FIGS. 1 and 2 illustrate a lock nut according to the invention which consists of an upper part 1 with a clamping cone 2 thereon which is provided with slots 3, and a lower part of a hollow conical shape which has a conical inner surface 6 which is adapted to engage with the upper surface of clamping cone 2. Slots 3 extend through the entire length of cone 2 and terminate in a relieving groove 4 at the base of cone 2.

The inclination of clamping cone 2 differs slightly from the inclination of the conical inner surface 6 of the lower part 5 so that, when the upper part 1 of the lock nut is tightened, the two conical surfaces will not seize on each other and the wedging action exerted upon the jaws of clamping cone 2 will tighten its inner screw threads upon the threads on bolt 9. In place of the relieving groove 4, cone 2 may also be provided with a reduced cylindrical portion 20 near its base. The corresponding portion of the inner surface 6 of the lower part 5 may then likewise be cylindrical and of a slightly larger diameter than portion 20.

The most important feature of the present invention resides in the provision of a resilient element 12 which is interposed between the upper part 1 and the lower part 2. This element may, for example, consist of a spring ring which is made of flat material and provided with a plurality of corrugations and a slot at one side. Instead of being made of flat material, spring ring 12 may also be made of round stock. In order to prevent spring ring 12 from spreading, it is preferably placed into shallow recesses in the upper and lower parts 1 and 5 or in at least one recess in one of these parts. These recesses are preferably made of a depth approximately corresponding to the thickness of the material of the spring.

The outer end of clamping cone 2 is provided with a small annular, outwardly projecting bead 7 which is interrupted by slots 3. Bead 7 is adapted to engage resiliently with the wall of a conical recess 8 at the outer end of the lower part 5. For assembly the different parts of the lock nut and to connect them to each other it is merely necessary to press the slotted cone 2 into the lower part 5. The individual jaws of cone 2 which are separated by slots 3 will then be pressed toward each other until bead 7 snaps into the conical recess 8.

If two workpieces, for example, two sheets of metal 10 and 11, are to be securely connected to each other by bolts 9, the upper part 1 of the lock nut as shown in FIG. 1 is screwed upon bolt 9 until the lower part 5 engages with sheet 10, whereupon the upper part 1 is tightened. The tightening effect occurs by the cooperation of the resilient clamping cone 2 with the resilient spring ring 12 in such a manner that the two workpieces are firmly pressed upon each other, while the screw threads of the clamping jaws of cone 2 are pressed radially into the screw threads of bolt 9. This will result in a very solid connection without any play between the individual parts, and because of the resilience of the clamping jaws of cone 2 and of spring ring 12, the screw threads are not subjected to any shearing stresses. The lock nut according to the invention cannot loosen up of its own accord. The strength and resilience of spring ring 12 determines the tension under which the lock nut will press upon sheets 10 and 11. If the upper part 1 of the lock nut is tightened beyond a certain extent, it will also turn the lower part 5 through spring ring 12 and thereby indicate that it has been tightened sufficiently. Spring rings 12 may be furnished of different strength for different tensions and they may be easily exchanged for one another.

Figure 3:
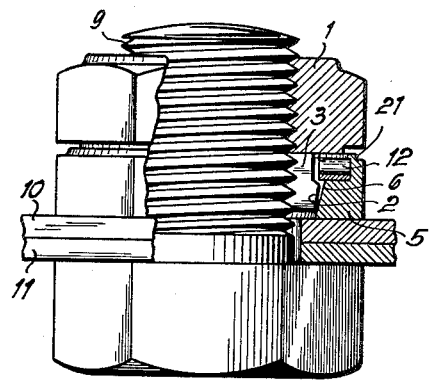
FIG. 3 shows a modification of the lock nut according to FIG. 1, likewise mounted on a bolt.
Figure 4:
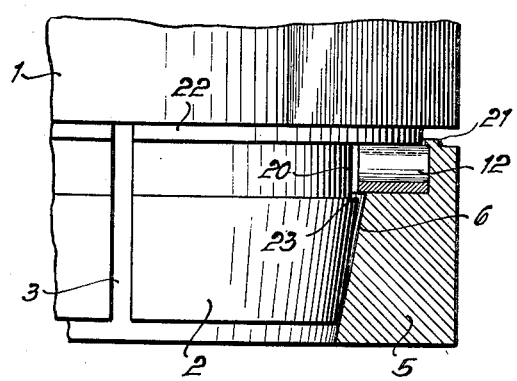
FIG. 4 shows a portion of FIG. 3 on an enlarged scale.
Figure 5:
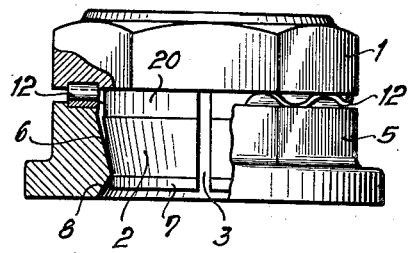
FIG. 5 shows a flat flange nut of a design similar to that illustrated in FIG. 2.
Figure 11:
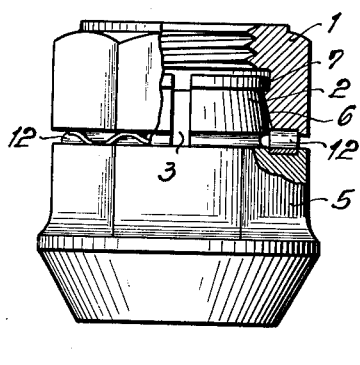
FIG. 11 shows a wheel nut of a design similar to that illustrated in FIG. 2.
Figure 12:
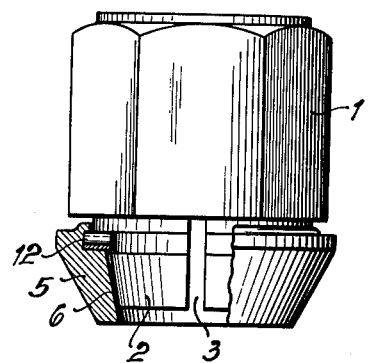
FIG. 12 shows a wheel nut of a design similar to that illustrated in FIG. 4.

In the embodiment of the invention illustrated in FIGS. 3 and 4, the spring ring 12 of the lock nut is fitted into an annular recess in the lower part 5 and retained therein by an annular flanged-over projection 21 at the outer periphery of part 5. The inner side of spring ring 12 which projects slightly over the upper edge of the conical surface 6 engages with a small projection 23 at the upper end of the clamping cone 2. Spring ring 12 is thus firmly connected to the lock nut. The upper part 1 then presses with a flanged portion 22 upon spring ring 12.

FIG. 8 illustrates another embodiment of the invention in which the upper part 1 of the lock nut is provided with an annular recess 24 in which spring ring 12 is mounted and acted upon by the lower part 5. The outer edge of the upper part 1 is provided with an annular inwardly projecting flange 21 which engages with a collar 25 on the lower part 5. The latter preferably has an outer conical surface to increase its area of engagement with the upper part 1. Consequently, recess 24 is of a similar hollow conical shape.

The other drawings illustrate various other embodiments of the invention which may be designed either in accordance with FIG. 2, FIG. 4, or FIG. 8. The lock nuts on which the invention may thus be applied may be of any desired type; they may be machine nuts, flat flange nuts, cap nuts, slotted nuts, wheel nuts for automobiles, setting rings, pipe connections, bolt connections, or the like. In any of these nuts, either the upper part 1 only or the lower parts 5, as well, may be provided with screw threads, as illustrated, for example, in FIGS. 9 and 10.

Figure 13:
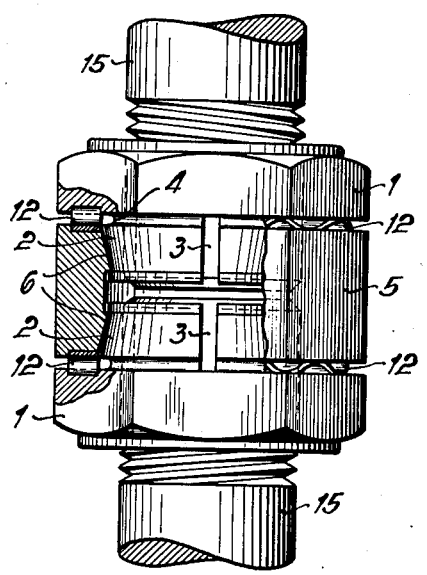
Figure 14:
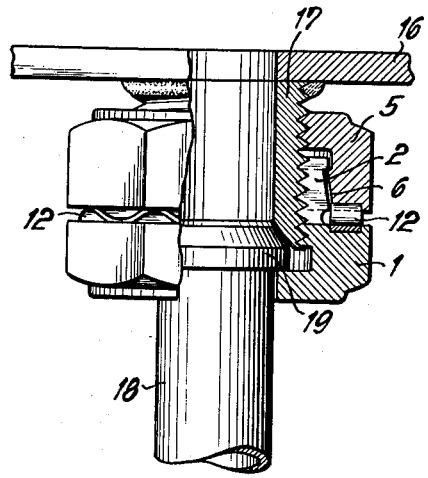
FIG. 14 shows a coupling nut according to the invention.

If the lock nut according to the invention is used for connecting pipes or bolts, as illustrated in FIG. 13, the two screw-threaded pipe or bolt ends 15 are screwed into upper parts 1 and also into a common lower part 5. For tightening the connection, both upper parts 1 are screwed in opposite directions. In the coupling nut as illustrated in FIG. 14, both parts 1 and 5 are likewise provided with screw threads and screwed upon a pipe socket 17 which terminates in a valve seat and is mounted on the bottom 16 of a container. The pipe connection 18 is provided with a beveled valve portion 19 and pressed firmly upon pipe socket 17 by means of the upper part 1.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A lock nut comprising an internally threaded upper part having a frusto-conical outer surface on at least an axial portion thereof with a plurality of axial slots in said portion so as to form clamping jaws, a hollow internally frusto-conical lower part surrounding said portion and movable relative thereto, a bead on one of said parts adapted to engage with the other part for holding said parts together, and metallic spring means interposed between said upper and lower parts to determine the amount of tension with which said lock nut is applied on said bolt and said jaws are clamped thereon.

2. A lock nut as defined in claim 1, wherein said spring means comprises a spring ring having a plurality of corrugations and a slot at one side of said ring.

3. A lock nut as defined in claim 1, wherein at least one of said upper and lower parts has a recess therein, said spring means being inserted into said recess, said recess having a depth substantially corresponding to the thickness of the material of said spring means.

4. A lock nut as defined in claim 1, wherein the slotted cone has near the inner end of its slots a cylindrical portion of a length less than the conical portion, the conical inner surface of said lower part surrounding said cone likewise having a cylindrical portion of a slightly larger diameter than and surrounding said first cylindrical portion.

5. A lock nut as defined in claim 1, wherein said bead is provided on the outer end of the slotted cone on said upper part and projects outwardly therefrom, said lower part having a hollow conical recess therein near its outer end, said bead engaging with the wall of said recess for holding said upper and lower parts together.

6. A lock nut as defined in claim 1, wherein said spring means is sunk in a groove in said lower part and retained therein at the outer side by an inwardly extending projection near the outer periphery of said lower part, and at the inner side by resting on an annular shoulder on said cone at the base thereof.

7. A lock nut as defined in claim 1, wherein said upper part has an annular groove therein into which said spring means, as well as a portion of said lower part are inserted, the outer edge of said upper part having an annular, inwardly projecting flange thereon, said lower part having a collar portion, said flange being adapted to engage with said collar portion.

8. A lock nut as defined in claim 7, wherein said lower part has a conical outer surface, said groove in said upper part having a corresponding hollow-conical shape.

References Cited in the file of this patent

UNITED STATES PATENTS

| | | |
|---|---|---|
| 236,624 | Pratt | Jan. 11, 1881 |
| 812,299 | Schmitt | Feb. 13, 1906 |
| 1,346,730 | Viebrock | July 13, 1920 |
| 1,820,965 | D'Halloy | Sept. 1, 1931 |
| 1,944,595 | Crowther | Jan. 23, 1934 |
| 2,369,865 | Spencer | Feb. 20, 1945 |
| 2,402,583 | Schumacher | June 25, 1946 |
| 2,464,152 | Ralston | Mar. 8, 1949 |
| 2,605,804 | Woodling | Aug. 5, 1952 |

FOREIGN PATENTS

| | | |
|---|---|---|
| 161,685 | Great Britain | Apr. 14, 1921 |
| 219,990 | Switzerland | June 16, 1942 |
| 435,516 | Italy | Mar. 18, 1948 |
| 1,102,407 | France | May 4, 1955 |
| 748,969 | Great Britain | May 16, 1956 |